(12) United States Patent
Tajima

(10) Patent No.: US 8,136,198 B2
(45) Date of Patent: Mar. 20, 2012

(54) WIPER APPARATUS FOR VEHICLE

(75) Inventor: Tetsuya Tajima, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 681 days.

(21) Appl. No.: 12/056,614

(22) Filed: Mar. 27, 2008

(65) Prior Publication Data

US 2008/0235895 A1    Oct. 2, 2008

(30) Foreign Application Priority Data

Mar. 28, 2007    (JP) .................................. 2007-83706

(51) Int. Cl.
 *B60S 1/06* (2006.01)
 *B60S 1/24* (2006.01)
 *B60S 1/16* (2006.01)
(52) U.S. Cl. ................. 15/250.3; 15/250.31; 15/250.27; 296/96.17; 74/42; 74/43
(58) Field of Classification Search ................. 15/250.3, 15/250.31, 250.27; 296/96.17; 74/42, 43
See application file for complete search history.

(56) References Cited

U.S. PATENT DOCUMENTS

| | | | | |
|---|---|---|---|---|
| 3,553,761 A | * | 1/1971 | Stevens | 15/250.14 |
| 4,477,293 A | * | 10/1984 | Timmis | 148/318 |
| 5,013,175 A | * | 5/1991 | Hayden | 403/24 |
| 5,142,941 A | | 9/1992 | Amann et al. | |
| 5,179,760 A | * | 1/1993 | Abe | 15/250.13 |
| 5,261,286 A | * | 11/1993 | Hayashi | 74/96 |
| 6,145,157 A | * | 11/2000 | Ostrowski | 15/250.31 |
| 6,553,606 B1 | | 4/2003 | Kanazawa et al. | |
| 7,249,394 B2 | | 7/2007 | Iwata | |
| 7,496,987 B2 | * | 3/2009 | Boissac | 15/250.3 |
| 2005/0097700 A1 | * | 5/2005 | Iwata | 15/250.3 |

FOREIGN PATENT DOCUMENTS

| | | |
|---|---|---|
| EP | 1 055 571 A2 | 11/2000 |
| EP | 1 547 880 A1 | 6/2005 |
| FR | 2 836 653 A1 | 9/2003 |
| JP | 03-503873 A | 8/1991 |
| JP | 2005-145093 | 6/2005 |

OTHER PUBLICATIONS

European Search Report for EP 08 29 0282 dated Oct. 15, 2009.
Office Action from corresponding Japanese Appln. No. 2007-083706 dated Nov. 1, 2011 with translation (4 pages).

* cited by examiner

*Primary Examiner* — Gary Graham
(74) *Attorney, Agent, or Firm* — McCormick, Paulding & Huber LLP

(57) ABSTRACT

A motor bracket to which a wiper motor is fixed, and a DR side pivot holder are coupled together by means of a DR side pipe frame inclined to a plane perpendicular in the axial direction of an output shaft of a wiper motor, and the motor bracket and an AS side pivot holder are coupled together by means of an AS side pipe frame inclined to the plane perpendicular in the axial direction of the output shaft. An output arm is fixed to the output shaft of the wiper motor, and the output arm is disposed between the DR side pipe frame and the AS side pipe frame, and between the connecting rod for coupling a DR side lever and an AS side lever, and the motor bracket.

2 Claims, 5 Drawing Sheets

WIPER APPARATUS FOR VEHICLE

CROSS-REFERENCE TO RELATED APPLICATIONS

Applicant hereby claims foreign priority benefits under U.S.C. §119 from Japanese Patent Application No. 2007-83706 filed on Mar. 28, 2007, the contents of which are incorporated by reference herein.

TECHNICAL FIELD OF THE INVENTION

The present invention relates to a wiper apparatus for vehicle having a first pivot shaft mounting a first wiper arm, and a second pivot shaft mounting a second wiper arm.

BACKGROUND OF THE INVENTION

Any automobile or vehicle is provided with a wiper apparatus for wiping off deposits from the windshield glass (front glass) such as rain and snow. The wiper apparatus includes a pivot shaft for mounting a wiper arm, and a wiper motor for oscillating and driving the pivot shaft, and the glass surface is wiped reciprocating the wiper arm on the glass surface by the wiper motor as the drive source.

Usually, an automobile or vehicle has two wiper arms, and the wiper apparatus, in this case, is mostly used tandem type having a pair of pivot shafts. In the tandem type wiper apparatus, levers are fixed to base ends of the pivot shafts, and these levers are connected together by a connecting rod so that the both pivot shafts may be interlocked in the same direction. The output arm is fixed to the output shaft of the wiper motor, and this output arm is coupled to one lever by means of a drive rod, so that the rotation of the wiper motor may be transmitted to each pivot shaft as oscillating motion.

On the other hand, the wiper apparatus having a pair of pivot shafts includes a frame integral type (modular type) assembling the pivot holder and wiper motor holding the pivot shafts oscillatably into one unit by using a frame.

For example, Japanese Patent Application Laid-Open Publication No. 2005-145093 (Patent Document 1) discloses a wiper apparatus in which a motor bracket is formed integrally in the main body of one pivot holder, a wiper motor is fixed to the motor bracket, this motor bracket and other pivot holder are coupled together by a pipe frame, and each pivot holder and wiper motor are assembled in one unit.

SUMMARY OF THE INVENTION

In the wiper apparatus disclosed in Patent Document 1, however, in order to avoid interference of the connecting rod and drive rod, it is required to dispose the motor bracket by deviating in the axial direction of the pivot shaft to the main body of the pivot holder, and dispose the output arm fixed to the output shaft between the motor bracket and the connecting rod.

¥As a result, the main body of the pivot holder and the motor bracket are largely deviated and disposed in the axial direction, and a rigidity of the entire wiper apparatus may be lowered due to deflection in the coupling portion of the main body and the motor bracket.

It is hence an object of the invention to enhance the rigidity of the wiper apparatus for vehicle of frame integral type coupling a pair of pivot holders and motor brackets by a frame.

A wiper apparatus for vehicle according to the present invention is having a first pivot shaft mounting a first wiper arm, and a second pivot shaft mounting a second wiper arm, the apparatus comprising: a first pivot holder for supporting the first pivot shaft oscillatably; a second pivot holder for supporting the second pivot shaft oscillatably; a motor bracket disposed between the first pivot holder and the second pivot holder; a wiper motor having an output shaft mounting an output arm, being fixed to the motor bracket; a drive rod for coupling a first lever fixed on the first pivot shaft and the output arm; a connecting rod for coupling the first lever and a second lever fixed on the second pivot shaft; a first frame disposed at an inclination to a plane perpendicular in the axial direction of the output shaft, having one end fixed to the motor bracket and other end fixed to the first pivot holder; and a second frame disposed at an inclination to a plane perpendicular in the axial direction of the output shaft, having one end fixed to the motor bracket and other end fixed to the second pivot holder, in which the output arm is disposed between the first frame and the second frame, and between the motor bracket and the connecting rod.

The wiper apparatus for vehicle according to the present invention is further comprising a plate-like main body for fixing the wiper motor to the motor bracket, and a protrusion projecting from the main body in the axial direction of the output shaft, in which one end of the first frame is fixed to the protrusion.

The wiper apparatus for vehicle according to the present invention is in which at least one of the first pivot shaft and the second pivot shaft is inclined to the output shaft, and the connecting rod is bent in a V-form.

According to the present invention, the first pivot holder and the second pivot holder are coupled together to the motor bracket by means of a pair of frames inclined to the plane perpendicular in the axial direction of the output shaft of wiper motor respectively, and if the output arm is disposed between the motor bracket and the connecting rod in order to prevent interference between the connecting rod and the drive rod, the pivot holders and motor brackets are firmly connected together by the frame, so that the rigidity of the wiper apparatus for vehicle may be enhanced. Besides, since the wiper motor is disposed between the first pivot holder and second pivot holder, the weight balance is enhanced, and the rigidity of the wiper apparatus for vehicle may be further enhanced.

According to the present invention, one end of the first frame is fixed to the protrusion projecting from the main body of the motor bracket in the axial direction of the output shaft, and the angle formed by the first frame between the first pivot holder and the motor bracket is set smaller, and the angle of the drive rod and the first lever may be narrowed.

According to the present invention, at least one of the first pivot shaft and second pivot shaft is inclined to the output shaft, and the connecting rod is bent in a V-form, so that the freedom of layout is enhanced in the output arm disposed between the connecting rod and the motor bracket, and the angle formed by the connecting arm with the first and second levers is smaller, and the transmission efficiency of power by the connecting rod is enhanced.

DESCRIPTION OF THE PREFERRED EMBODIMENTS

The embodiments of the present invention are specifically described below while referring to the accompanying drawings.

Figure 1:
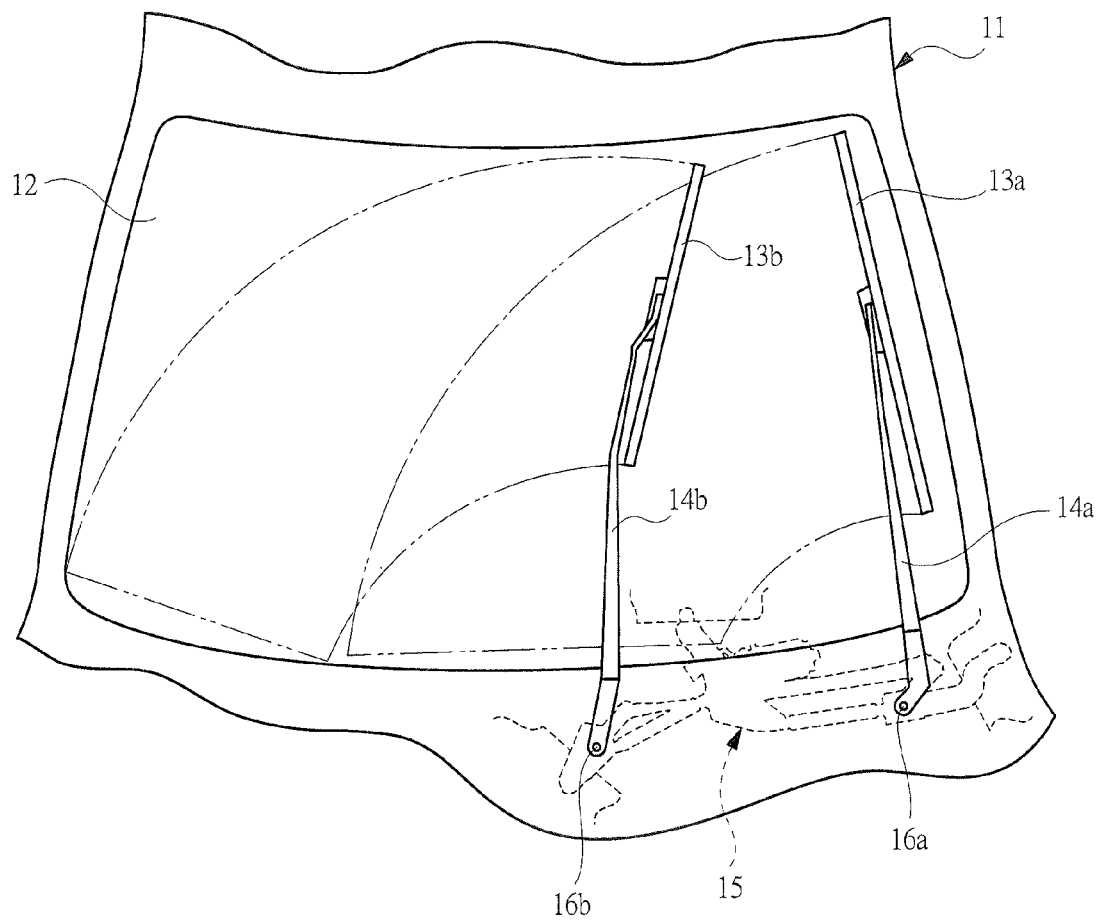
FIG. 1 is an explanatory diagram showing a part of a vehicle provided with a wiper apparatus for vehicle in an embodiment of the present invention.

FIG. 1 is an explanatory diagram showing a part of a vehicle provided with a wiper apparatus for vehicle in an embodiment of the present invention, in which a vehicle 11 is provided with a driver's seat side or DR side wiper blade 13a and an assistant's seat side or AS side wiper blade 13b for wiping a windshield glass (front glass) 12. The DR side wiper blade 13a is a first wiper arm attached to the leading end of a driver's seat side or DR side wiper arm 14a, and the AS side wiper blade 13b is a second wiper arm attached to the leading end of an assistant's seat side or AS side wiper arm 14b, and both are force by springs, not shown, provided in the wiper arms 14a, 14b, and elastically contact with the windshield glass 12.

The vehicle 11 has a wiper apparatus for vehicle 15 (called wiper apparatus 15 hereinafter) for driving the wiper arms 14a, 14b for carrying out wiping operations. Wiping patterns of the wiper apparatus 15 are of tandem type, and the wiper arms 14a, 14b are driven by the wiper apparatus 15, and oscillate in the same direction between upward inverting position and downward inverting position, and wipe the windshield glass 12.

Figure 2:
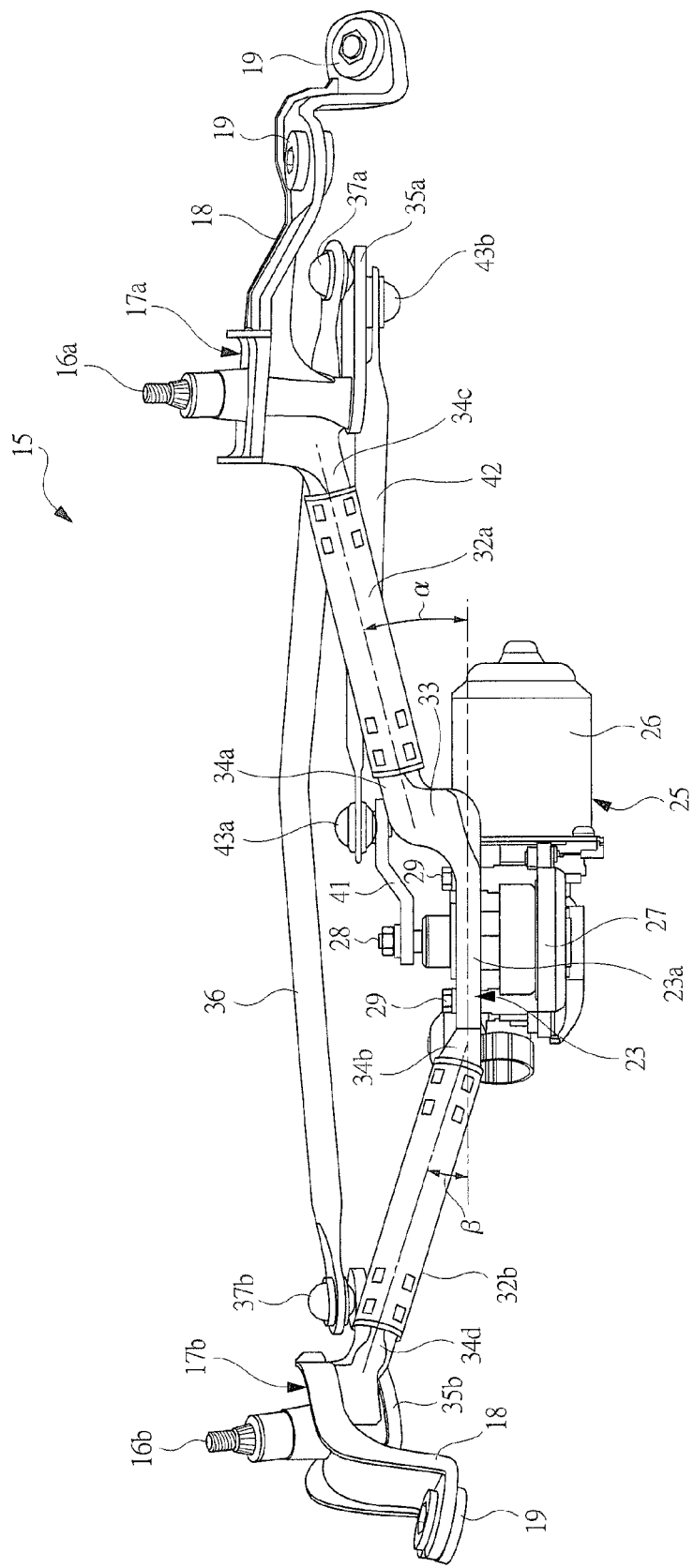
FIG. 2 is a front view of a detail of the wiper apparatus shown in FIG. 1.
Figure 3:
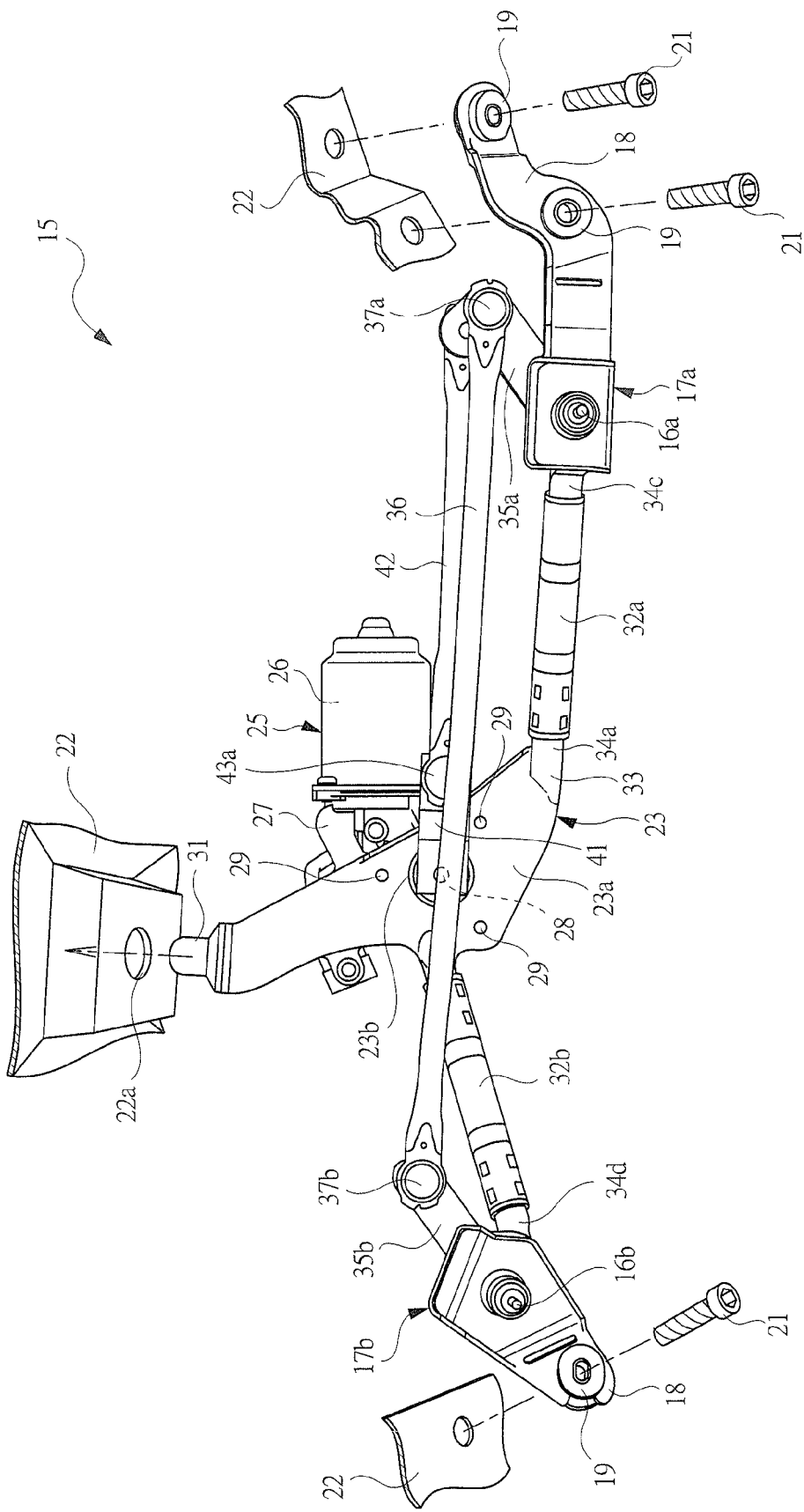
FIG. 3 is a plan view of the wiper apparatus shown in FIG. 2.

FIG. 2 is a front view showing a detail of the wiper apparatus shown in FIG. 1, and FIG. 3 is a plan view of the wiper apparatus shown in FIG. 2.

As shown in FIG. 2 and FIG. 3, the wiper apparatus 15 is provided with a first pivot shaft, that is, a driver's seat side or DR side pivot shaft 16a, and a second pivot shaft, that is, an assistant's seat side or AS side pivot shaft 16b, and as shown in FIG. 1, the DR side wiper arm 14a is attached to the leading end of the DR side pivot shaft 16a, and the AS side wiper arm 14b is attached to the leading end of the AS side pivot shaft 16b.

The DR side pivot shaft 16a is oscillatably supported at a first pivot holder, that is, a driver's seat side or DR side pivot holder 17a about its axial center, and the AS side pivot shaft 16b is oscillatably supported at a second pivot holder, that is, an assistant's seat side or AS side pivot holder 17b about its axial center. The both pivot holders 17a and 17b are made of aluminum material and formed by die-casting process, and are fixed, as shown in FIG. 3, to a car body panel 22 by bolts 21 by way of a rubber-made grommet (mount) 19 at each mounting leg 18.

Between the DR side pivot holder 17a and the AS side pivot holder 17b, and at a position deviated to the downward side in the axial direction of the pivot shafts 16a, 16b to the pivot holders 17a, 17b (the opposite side in the projecting direction of the pivot shafts 16a, 16b from the pivot holders 17a, 17b), a motor bracket 23 is disposed, and a wiper motor 25 is fixed to the motor bracket 23 as the drive source for driving the pivot shafts 16a, 16b. In the shown example, the pivot holders 17a, 17b are made of aluminum material, but resin or other material may be also used.

The wiper motor 25 has an electric motor 26, and a control device (not shown) is connected to the electric motor 26. When a wiper switch (not shown) provided in the compartment is manipulated, a driving current is supplied to the electric motor 26 from the control device depending on its manipulation signal, and the electric motor 26 operates in the specified direction. The electric motor 26 is provided with a reduction gear 27, and a rotation of the electric motor 26 is reduced by the reduction gear 27, and is output from an output shaft 28 provided in the reduction gear 27.

As the electric motor 26, for example, a brush type direct-current motor is used, and the control device is, for example, a microcomputer having CPU (central processing unit) and memory or the like.

On the other hand, the motor bracket 23 is made of cast iron and the like, and has a main body 23a formed like a plate, and the wiper motor 25 is fixed nearly to the center of the main body 23a by bolts 29 in the portion of the reduction gear 27. A through-hole 23b is provided in the main body 23a of the motor bracket 23, and the output shaft 28 of the wiper motor 25 fixed to the motor bracket 23 projects from the reverse side to the surface side of the motor bracket 23 to which the wiper motor 25 is fixed by way of this through-hole 23b. The surface side of the motor bracket 23 is the side facing the pivot holders 17a, 17b of the motor bracket 23.

As mentioned above, since the motor bracket 23 is deviated and disposed at the downward side in the axial direction to the pivot holders 17a, 17b, the output shaft 28 projecting from the motor bracket 23 is deviated and disposed to the side of the motor bracket 23 from the pivot shafts 16a, 16b, or pivot holders 17a, 17b.

As shown in FIG. 3, an insertion pin 31 is fixed in the motor bracket 23, and when the insertion pin 31 is inserted into a support hole 22a formed in the car body panel 22, the motor bracket 23 is positioned in the car body panel 22.

In the shown case, the motor bracket 23 is made of cast iron, but not limited to this material, it may be formed of resin or plate metal or the like. Further, a rubber-made grommet may be fitted between the insertion pin 31 and support hole 22a.

In this wiper apparatus 15, the pivot holders 17a, 17b are connected to the motor bracket 23 by pipe frames 32a, 32b, respectively.

Figure 4:
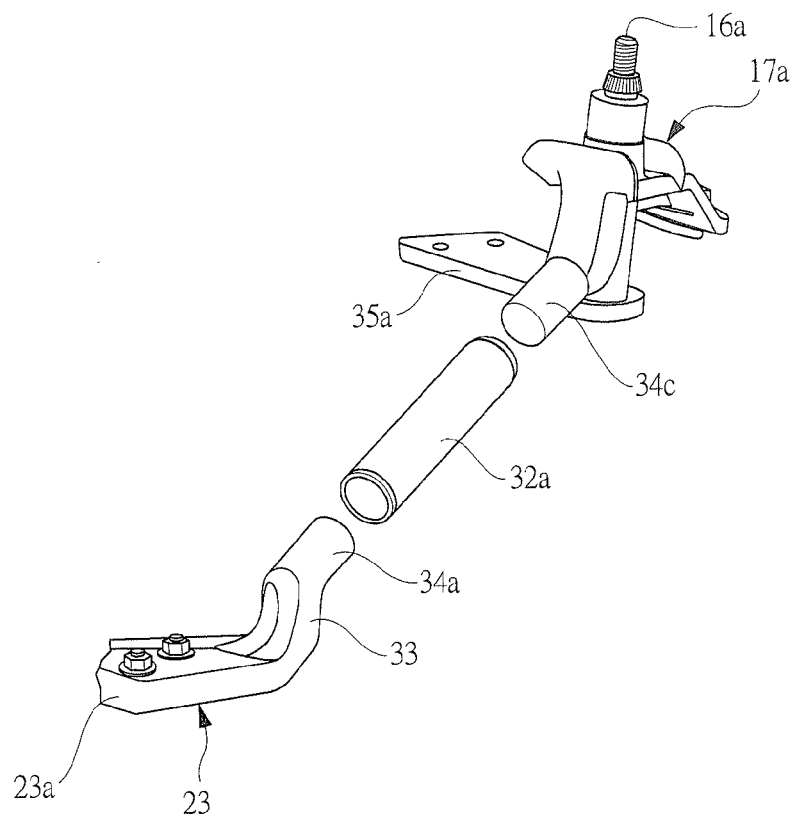
FIG. 4 is an exploded perspective view of coupling structure of a motor bracket and a DR side pivot holder.
Figure 5:
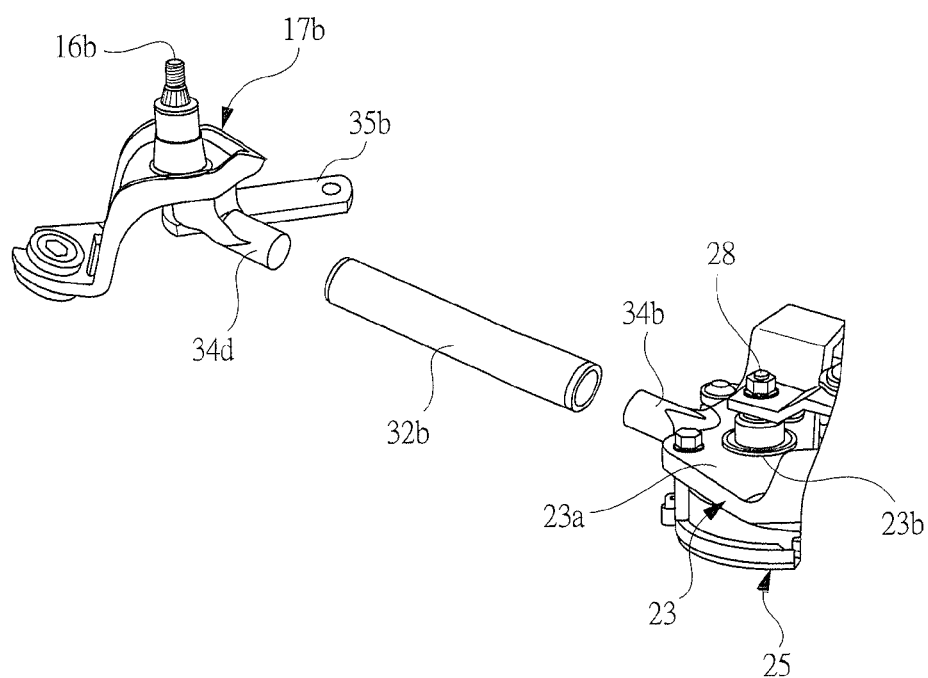
FIG. 5 is an exploded perspective view of coupling structure of the motor bracket and an AS side pivot holder.

FIG. 4 is an exploded perspective view of coupling structure of the motor bracket and the DR side pivot holder, and FIG. 5 is an exploded perspective view of connecting structure of the motor bracket and the AS side pivot holder.

As shown in FIG. 2 to FIG. 4, a protrusion 33 projecting to the side of the DR side pivot holder 17a in the axial direction of the output shaft 28 to the main body 23a from the surface from the main body 23a is provided integrally at the end of the side of the DR side pivot holder 17a to the wiper motor 25 of the motor bracket 23, and a circular columnar connecting boss 34a projecting to the DR side pivot holder 17a is provided integrally at this protrusion 33. As shown in FIG. 2 and FIG. 5, a columnar connecting boss 34b projecting to the AS side pivot holder 17b is provided integrally at the opposite side across the wiper motor 25, that is, at the end of the side of the AS side pivot holder 17b, to the connecting boss 34a of the motor bracket 23. The connecting boss 34b is formed to extend obliquely outward (perpendicularly to the line linking the connecting boss 34a and pin 31 in FIG. 3) from an approximately intermediate position of the motor bracket 23 linking with the insertion pin 31 to the connecting boss 34a. Further, as shown in FIG. 2 to FIG. 4, the DR side pivot holder 17a is provided integrally with a columnar connecting boss 34c projecting to the DS side connecting boss 34a, and the AS side pivot holder 17b is provided integrally with a columnar connecting boss 34d projecting to the AS side connecting boss 34b.

The DR side pipe frame 32a as a first frame for connecting the motor bracket 23 and DR side pivot holder 17a is formed in a cylindrical shape with a circular section, that is, like a hollow pipe, and the inside diameter is slightly larger than the outside diameter of the connecting bosses 34a, 34c. Similarly, the AS side pipe frame 32b as a second frame for connecting the motor bracket 23 and AS side pivot holder 17b is formed in a cylindrical shape with a circular section, that is, like a hollow pipe, and the inside diameter is slightly larger than the outside diameter of the connecting bosses 34b, 34d. The pipe frames 32a, 32b are formed straightly, and are formed nearly in the same length.

One end of the DR side pipe frame 32a is fitted to the connecting boss 34a of the motor bracket 23, and is crimped in this state, and is thereby fixed to the connecting boss 34a. That is, the one end of the DR side pipe frame 32a is fixed to the motor bracket 23 at the protrusion 33. Other end of the DR side pipe frame 32a is fitted to the connecting boss 34c of the DR side pivot holder 17a, and is crimped in this state, and is thereby fixed to the connecting boss 34c, that is, to the DR side pivot holder 17a.

Similarly, one end of the AS side pipe frame 32b is fitted to the connecting boss 34b of the motor bracket 23, and is crimped in this state, and is thereby fixed to the connecting boss 34b, that is, to the motor bracket 23. Other end of the AS side pipe frame 32b is fitted to the connecting boss 34d of the AS side pivot holder 17b, and is crimped in this state, and is thereby fixed to the connecting boss 34d, that is, to the AS side pivot holder 17b.

In this configuration, the pivot holders 17a, 17b are connected to the motor bracket 23 by means of the pipe frames 32a, 32b, and the wiper apparatus 15 is formed as one unit as frame integral type.

Herein, the motor bracket 23 is deviated to the downward side in the axial direction of the pivot shafts 16a, 16b relatively to the pivot holders 17a, 17b, and is projected toward the connecting bosses 34a to 34d corresponding to the connecting bosses 34a to 34d, and hence the axial direction of the DR side pipe frame 32a is inclined by a specified angle □ (see FIG. 2) to a plane perpendicular in the axial direction of the output shaft 28, and in the axial direction of the AS side pipe frame 32b is inclined by a specified angle □ (see FIG. 2) to a plane perpendicular in the axial direction of the output shaft 28. The pivot holders 17a, 17b are connected to the pipe frames 32a, 32b with the axial direction inclined in the axial direction of the output shaft 28 of the wiper motor 25, and thereby the pivot shafts 16a, 16b are inclined in the direction departing from the output shaft 28, more at the leading end side, to the output shaft 28 of the wiper motor 25.

At the base end of the DR side pivot shaft 16a, as a first lever, a driver's seat side, that is, DR side lever 35a is fixed, and at the base end of the AS side pivot shaft 16b, as a second lever, an assistant's seat side, that is, AS side lever 35b is fixed. These levers 35a, 35b are formed of steel plates or the like, and are fixed to the pivot shafts 16a, 16b so that their axial direction may be orthogonal in the axial direction of the corresponding pivot shafts 16a, 16b. The DR side lever 35a and the AS side lever 35b are coupled together by means of the connecting rod 36.

Figure 6:
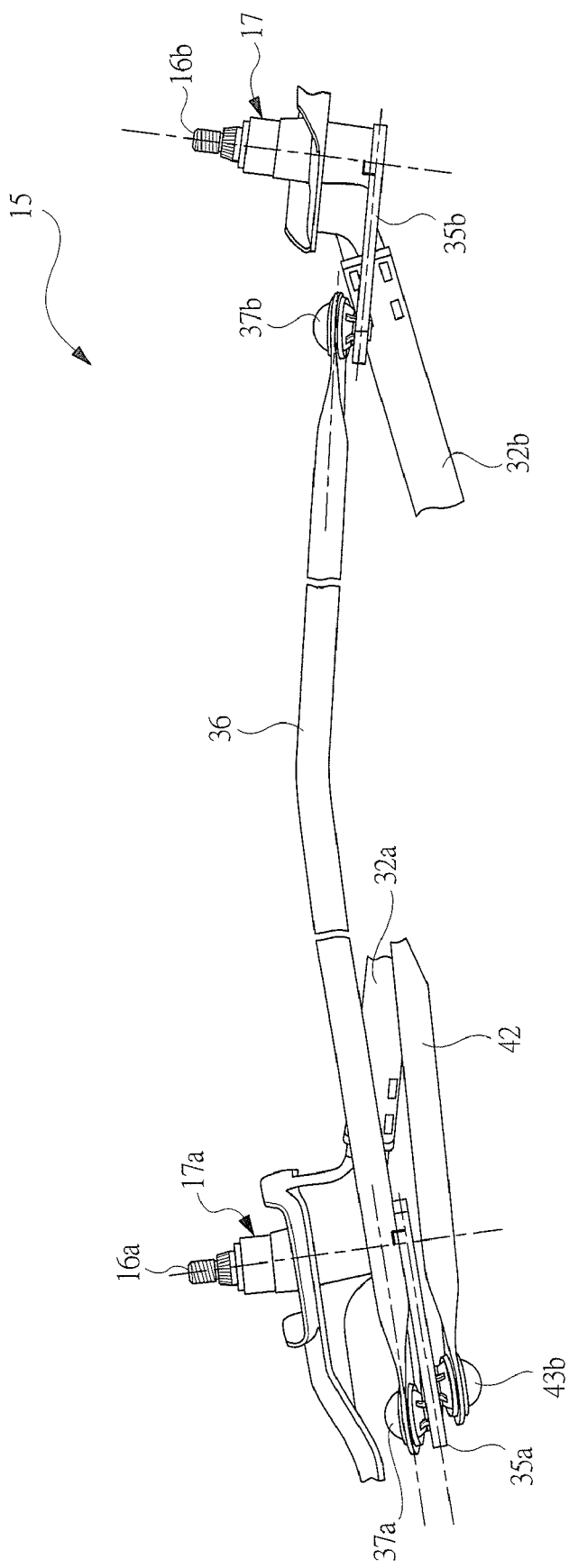
FIG. 6 is a front view of connecting structure of levers and a connecting rod.

FIG. 6 is a front view of connecting structure of the levers and the connecting rod.

The connecting rod 36 is a pipe material formed in a specified length, and one end is oscillatably and tiltably coupled to the leading end of the DR side lever 35a by means of a ball joint 37a, and other end is oscillatably and tiltably coupled to the leading end of the AS side lever 35b by means of a ball joint 37b. Accordingly, when the DR side pivot shaft 16a oscillates, this oscillating motion is transmitted to the AS side lever 35b by way of the DR side lever 35a and connecting rod 36, and the AS side pivot shaft 16b oscillates in the same direction and at the same timing as the DR side pivot shaft 16a.

The connecting rod 36 moves to a side apart from the motor bracket 23 nearly in the intermediate part in the longitudinal direction, and is bent in a V-form, and the one end is nearly parallel to the DR side lever 35a, and other end is nearly parallel to the AS side lever 35b. Therefore, if the DR side pivot shaft 16a and the AS side pivot shaft 16b are inclined to the output shaft 28, the angle formed by the DR side lever 35a and the connecting rod 36, and the angle formed by the AS side lever 35b and the connecting rod 36 are both smaller, and the transmission efficiency of the moving force between the levers 35a and 35b by the connecting rod 36 is enhanced.

As shown in FIG. 2 and FIG. 3, an output arm 41 is fixed to the output shaft 28 of the wiper motor 25. The output arm 41 is called a crank arm, and is made of a steel plate or the like bent like a crank, and its base end is fixed to the output shaft 28.

The output arm 41 is coupled to the DR side lever 35a by means of a drive rod 42. That is, at the leading end of the output arm 41, one end of the drive rod 42 is oscillatably and tiltably coupled by means of a ball joint 43a, and other end of the drive rod 42 is oscillatably and tiltably coupled to the leading end of the DR side lever 35a by means of a ball joint 43b. Accordingly, when the electric motor 26 operates, the output arm 41 rotates in the specified direction together with the output shaft 28, and by this rotation, the drive rod 42 moves reciprocally, and the DR side lever 35a oscillates. Thus, the DR side pivot shaft 16a is driven and oscillated by the wiper motor 25.

As shown in FIG. 2, the drive rod 42 is coupled to the DR side lever 35a at opposite side to the side coupled to the connecting rod 36 (the side facing the motor bracket 23), and the output arm 41 to which the drive rod 42 is coupled is disposed between the connecting rod 36 and the motor bracket 23. Hence, the drive rod 42 is deviated to the side of the motor bracket 23 from the connecting rod 36, and is disposed nearly parallel to the connecting rod 36, thereby avoiding interference with the connecting rod 36. Further, to prevent interference of the drive rod 42 with the pipe frames 32a, 32b, the output arm 41 is disposed between the pipe frames 32a and 32b. That is, the output arm 41 is disposed in a space surrounded by the pipe frames 32a, 32b, the connecting rod 36, and the motor bracket 23.

Thus, in this wiper apparatus 15, to prevent interference of the connecting rod 36 and the drive rod 42, the motor bracket 23 is disposed as being deviated to the downward side in the axial direction from the pivot holders 17a, 17b, and the output arm 41 is disposed between the motor bracket 23 and the connecting rod 36, but the DR side pivot holder 17a and the AS side pivot holder 17b are connected to the motor bracket 23 by means of the pipe frames 32a, 32b respectively, and therefore the connecting of the pivot holders 17a, 17b with the motor bracket 23 is firm, and a rigidity of the wiper apparatus 15 is enhanced. The pipe frames 32a, 32b are formed nearly in the same length, and the wiper motor 25 is disposed nearly in the intermediate portion of the DR side pivot holder 17a and the AS side pivot holder 17b, and the weight balance is improved, and the rigidity of the wiper apparatus 15 may be further enhanced.

In the wiper apparatus 15 shown in FIG. 2, the nearly intermediate portion of the connecting rod 36 is bent in the direction departing from the motor bracket 23, and hence the spacing of the connecting rod 36 and the motor bracket 23 is widened, and the freedom of layout of the output arm 41 is enhanced.

In the wiper apparatus 15, since one end of the DR side pipe frame 32a is fixed to the protrusion 33 projecting in the axial direction of the output shaft 28 from the main body 23a of the motor bracket 23, the angle formed by the DR side pipe frame 32a and the plane perpendicular in the axial direction of the output shaft 28 is set smaller, so that the angle formed by the drive rod 42 and the DR side lever 35a may be set narrowed.

The present invention is not limited to the above-mentioned embodiment, and may be changed and modified freely without departing from the scope and spirit of the invention. For example, in the embodiment, the first and second frames are formed in pipes having a circular section, but not limited to this shape, they may be formed of hollow members or solid members having other sectional shape.

In the above-mentioned embodiment, both the DR side pivot shaft 16a and the AS side pivot shaft 16b are inclined to the output shaft 28, but not limited to this example, only one of the pivot shafts may be inclined to the output shaft, or the both pivot shafts 16a, 16b may be disposed parallel to the output shaft 28, or instead of straight pipe frames, bent pipe frames may be also used.

In the above-mentioned embodiment, the protrusion 33 is provided at the DR side of the motor bracket 23, and is coupled to the DR side pipe frame 32a, but not limited to this configuration, in relation to the car body, the protrusion 33 may be provided at the AS side, and coupled to the AS side pipe frame 32b, or the protrusion 33 may be provided both at the DR side and at the AS side of the motor bracket 23, and the both pipe frames 32a, 32b may be connected to the protrusion 33.

What is claimed is:

1. A wiper apparatus for vehicle having a first pivot shaft mounting a first wiper arm, and a second pivot shaft mounting a second wiper arm, the apparatus comprising:
    a first pivot holder for supporting the first pivot shaft oscillatably, the first pivot holder having a first mounting leg which is fixed to a car body panel;
    a second pivot holder for supporting the second pivot shaft oscillatably, the second pivot holder having a second mounting leg which is fixed to the car body panel;
    an elongated motor bracket defining opposite ends disposed between the first pivot holder and the second pivot holder, the motor bracket having one end provided with an insertion pin that is inserted into a support hole of the car body panel to fix the motor bracket to the car body panel such that the motor bracket is inclined with respect to an axis of the support hole toward the first pivot holder;
    a wiper motor having an output shaft mounting an output arm, being fixed to the motor bracket;
    a drive rod for coupling a first lever fixed on the first pivot shaft and the output arm;
    a connecting rod for coupling the first lever and a second lever fixed on the second pivot shaft;
    a first frame, formed separately from the motor bracket and the first pivot holder, disposed at an inclination to a plane perpendicular in the axial direction of the output shaft, having one end fixed to the other end of the motor bracket, and having the other end fixed to the first pivot holder; and
    a second frame, formed separately from the motor bracket and the second pivot holder, disposed at an inclination to a plane perpendicular in the axial direction of the output shaft, having one end fixed to an intermediate portion of the motor bracket, and having the other end fixed to the second pivot holder,
    wherein the output arm is disposed between the first frame and the second frame, and between the motor bracket and the connecting rod, at least one of the first pivot shaft and the second pivot shaft is inclined to the output shaft, and the connecting rod is bent in a V-form, and a nearly intermediate portion of the connecting rod is bent away from the motor bracket.

2. The wiper apparatus for vehicle according to claim 1, further comprising a plate-shape main body for fixing the wiper motor to the motor bracket, and a protrusion projecting from the main body in the axial direction of the output shaft, wherein one end of the first frame is fixed to the protrusion.

* * * * *